United States Patent [19]

Greenway et al.

[11] Patent Number: 4,960,630

[45] Date of Patent: Oct. 2, 1990

[54] APPARATUS FOR PRODUCING SYMMETRICAL FLUID ENTANGLED NON-WOVEN FABRICS AND RELATED METHOD

[75] Inventors: John M. Greenway, Westwood, Mass.; Walter E. Schortmann, Cumberland, R.I.; Peter Mancini, Walpole, Mass.; Dennis Metrick, Cumberland, R.I.; Timothy Connolly, Norwood, Mass.

[73] Assignee: International Paper Company, Purchase, N.Y.

[21] Appl. No.: 181,284

[22] Filed: Apr. 14, 1988

[51] Int. Cl.$^5$ ............................... B32B 3/10
[52] U.S. Cl. ...................... 428/131; 28/104; 28/105; 428/224; 428/299
[58] Field of Search ............... 428/131, 233, 296, 299, 428/224; 28/104, 105

[56] References Cited

U.S. PATENT DOCUMENTS

| | | | |
|---|---|---|---|
| 2,862,251 | 12/1958 | Kalwaites | 19/161 |
| 2,981,999 | 5/1961 | Russell | 28/1 |
| 3,081,515 | 3/1963 | Griswold et al. | 28/78 |
| 3,113,349 | 12/1963 | Nottebohm et al. | 19/161 |
| 3,434,188 | 3/1969 | Summers | 28/72.2 |
| 3,458,905 | 8/1969 | Dodson, Jr. et al. | 19/161 |
| 3,485,706 | 12/1969 | Evans | 161/72 |
| 3,485,708 | 12/1969 | Ballou et al. | 161/72 |
| 3,485,709 | 12/1969 | Evans et al. | 161/109 |
| 3,486,168 | 12/1969 | Evans et al. | 161/169 |
| 3,493,462 | 2/1970 | Bunting, Jr. et al. | 161/169 |
| 3,494,821 | 2/1970 | Evans | 161/169 |
| 3,498,874 | 3/1970 | Evans et al. | 161/109 |
| 3,508,308 | 4/1970 | Bunting, Jr. et al. | 28/72.2 |
| 3,531,363 | 9/1970 | Shambelan | 161/72 |
| 3,750,237 | 8/1973 | Kalwaites | 19/161 P |
| 4,152,480 | 5/1979 | Adachi et al. | 428/227 |
| 4,379,799 | 4/1983 | Holmes et al. | 428/131 |
| 4,647,490 | 3/1987 | Bailey et al. | 428/131 |

*Primary Examiner*—James J. Bell
*Attorney, Agent, or Firm*—Francis J. Clark

[57] ABSTRACT

An apparatus and related process for entangling a staple fibrous web which employs divergent fluid jets. The web is advanced through an entangling station on a conveying means which supports an entangling member having a symmetrical pattern of fluid pervious void areas. The divergent jet sprays which are disposed above the entangling member direct a continuous curtain of fluid onto the web, coacting with the entangling member to entangle web fibers into a coherent lattice structure. The divergent jet sprays are provided by nozzles having wide orifice diameters which accommodate less complex fluid recirculation and filtration systems than employed in prior art columnar jet processes.

49 Claims, 12 Drawing Sheets

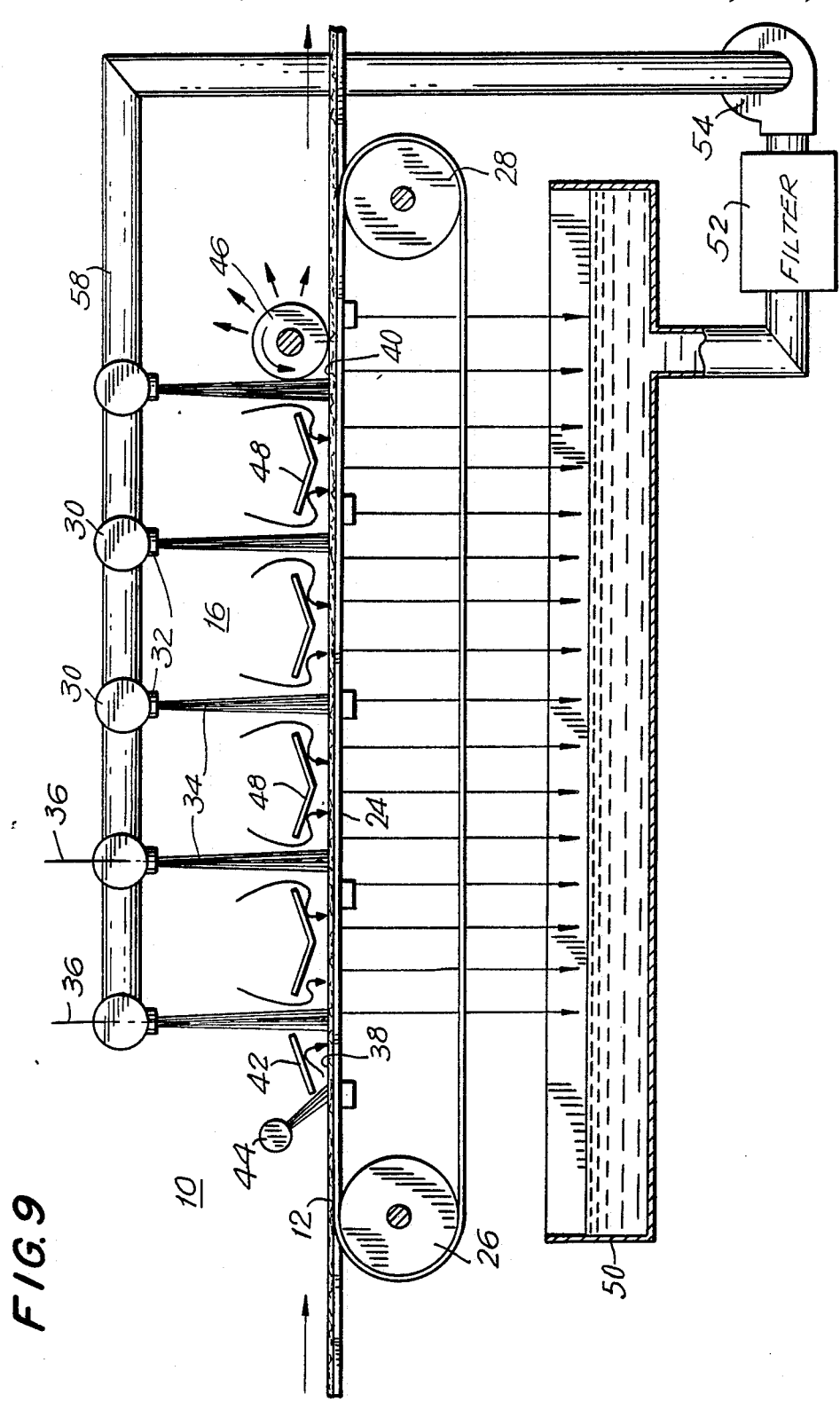

M.D.

10 X SIZE

M.D.

10 X SIZE

M.D. ↕

10X SIZE

M.D. ↕

M.D.

1.8 X SIZE

M.D.

1.8 SIZE 1.8 X SIZE

10 X SIZE

APPARATUS FOR PRODUCING SYMMETRICAL FLUID ENTANGLED NON-WOVEN FABRICS AND RELATED METHOD

FIELD OF INVENTION

This invention generally relates to an apparatus for use in-line with carding apparatus for entangling a non-woven web. More particularly, it is concerned with a divergent jet fluid entangling apparatus and related process which precisely orient fibers in a non-woven web into prescribed patterns without requirement of complex filtration, scrambler and air lay systems of the prior art. Non-woven fabrics produced by the method of the invention have a patterned symmetrical structure with machine and cross-direction ("MD/CD") randomization ratios in the range of 1:1–4:1 and corresponding MD/CD tensile strengths.

BACKGROUND ART

In prior art fluid entangling processes, webs of non-woven fibers are treated with high pressure fluids while supported on apertured patterning screens. Typically, the patterning screen is provided on a drum or continuous conveyor which traverses pressurized fluid jets. Entanglement is effected by employing columnar jet streams which entangle fibers in the web into ordered groups and configurations corresponding to the aperture array in the patterning screen. Non-woven fabrics having MD and CD tensile strengths and randomized structures are produced by action of the jet streams which cause fibers in the web to migrate to apertured or void areas in the screen, entangle and intertwine.

Commercial apparatus which practice this technology generally employ pumping and filtration systems which recirculate fluid from jet streams for reuse. Particular difficulty in high pressure hydroentangling processes is presented by the use of columnar jet streams which are provided by small diameter orifice nozzels. Complex filtration systems are required to remove fiber debris which is dislodged from the web by the high pressure jet streams to prevent clogging of the debris in jet nozzles.

To achieve effective hydroentangling of fibers known processes also employ a variety of carding operations and fiber randomization processes. For example, carded web may be randomized by scrambling and air lay systems prior to entangling.

In conventional entangling processes, air is entrained by high pressure columnar jets which lift the web from the patterning screens resulting in irregularities in the structure of the formed fabric. To counteract this effect, prior art processes employ vacuum systems including, arrangements of slots which are positioned beneath the patterning screen in alignment with the jets to hold the web to the screen. For this same purpose, the art also employs top screens which are placed over the web to restrain its movement.

Vacuum and screen baffling systems of the prior art introduce machine complexity and associated tooling costs. Top screens lower energy efficiency of the entangling process by reducing the energy flux of fluids which impinge upon the web, restricting movement of the fibers. See U.S. Pat. No. 2,862,251 to F. Kalwaites.

Prior art hydroentangling processes for producing patterned non-woven fabrics which employ high pressure columnar jet streams are represented by U.S. Pat. Nos. 3,485,706 and 3,498,874, respectively, to Evans and Evans et al, and U.S. Pat. No. 4,379,799 to Holmes et al.

The present invention is directed to a fluid entangling process and related apparatus for producing novel non-woven fabrics without requirement of the complex machinery of the prior art. Departing from conventional processes, the present invention employs pressurized fan jets with wide diameter outlet orifices to direct divergent fluid sprays to non-randomized fibrous webs. The divergent jets coact with specially configured forming members which support the web. Wide diameter divergent jet nozzles employed in the invention facilitate recirculation of jet streams without requirement of complex filtration systems.

It will be recognized that a process which employs divergent jet streams yields advantages in machinery design and energy efficiencies. The invention departs from the prior art practices which found divergent jets unacceptable for use in entangling processes. The art teaches that divergent sprays entrain excessive air volumes, generating turbulence at web surfaces, yielding non-woven fabrics having non-uniform fiber characteristics. See U.S. Pat. No. 3,498,874 to Evans et al., col. 6, lines 49–75.

Accordingly, it is a broad object of the invention to provide an improved fluid entangling apparatus and related method for production of a variety of novel non-woven fabrics having tensile strength and structural characteristics which advance the art.

A more specific object of the invention is to provide hydroentangling apparatus which is mechanically less complex than employed in prior art processes.

A further object of the invention is to provide a hydroentangling apparatus and process which produce non-woven fabrics having symmetrical structures and MD/CD randomization ratios in the range of 1:1–4:1.

A still further object of the invention is to produce non-wovens having improved tensile strength characteristics employing apparatus and processes which are less complex as compared to the prior art.

DISCLOSURE OF THE INVENTION

In the present invention, these purposes, as well as others which will be apparent, are achieved generally by providing an apparatus and related process for entangling a staple, non-randomized fibrous web which employs divergent fluid jets to randomize and entangle web fibers. The web is advanced through an entangling station on a conveying means which supports an entangling member or forming screen having a symmetrical pattern of fluid pervious void areas. Divergent jet sprays which are disposed above the entangling member direct a continuous curtain of fluid onto the web, coacting with the entangling member to precisely orient the fiber structure and entangle the web fibers into a coherent lattice structure.

To disperse air entrained at the web surface, control means are provided which includes a baffle plate and coacting means for directing an air curtain to the web at an entry area of the entangling station. The control means also includes a generally hollow perforated cylindrical roll disposed for frictional rotatable movement on the web at a terminal end area of the entangling station.

In a preferred embodiment of the invention, a plurality of divergent jet nozzles are mounted on closely packed cross-directionally aligned spaced manifolds.

Divergent jets oriented in the CD are provided with angles of divergence in the range of 2 to 30 degrees, and located within 3 to 6 inches from the entangling member. Pressure is preferably ramped in the MD from manifold to manifold over a pressure range of 200–1100 psi to impart energy to the web of approximately 1.0 hp-hr/lb of fabric.

It is a feature of the invention to employ an entangling member which has a symmetrical pattern of void areas which correspond to preferred fabric patterns. The void areas preferably occupy at least 25 per cent of the entangling member area. Improved MD and/or CD tensile strengths are obtained by void patterns having varying MD/CD configurations. The preferred pattern includes a plurality of apertures arranged so that the spacing ratio of MD apertures is greater than CD apertures. This pattern yields a novel fabric pattern in which an array of dense nodes are connected by a diamond shaped pattern of interstitial fibers.

The apparatus and related method of the invention advance the art by use of a divergent jet system which is less complex and precision demanding than hydroentangling systems of the prior art. Divergent jet nozzles employed in the invention have wide orifice diameters as compared to prior art columnar jet systems and, accordingly, do not require the exacting filtration systems of the prior art. Fiber debris contained in fluid recirculated to the divergent jet nozzles in the entangling process pass through the wide diameter orifices without clogging as is prevalent in prior art columnar systems which have small diameter orifices.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 9 is a cross-section of an alternative entangling apparatus embodiment, similar to FIG. 4, in which baffles are arranged in proximity to the web between spaced manifolds;

BEST MODE OF CARRYING OUT THE INVENTION

Figure 1:
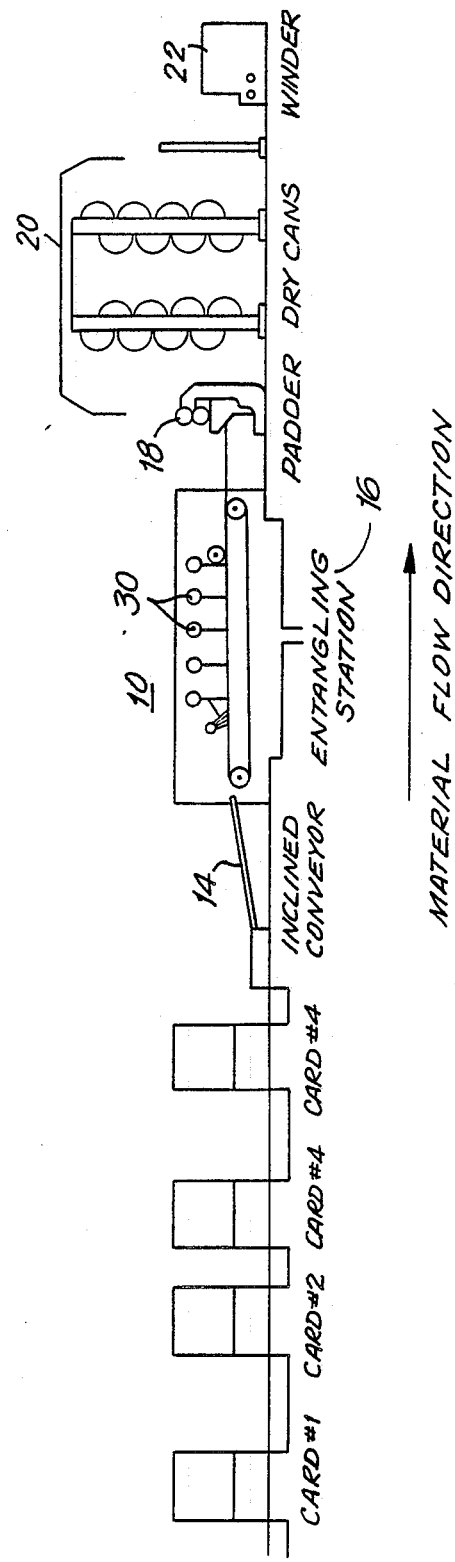
FIG. 1 is a schematic view of a production line including an entangling station in accordance with the invention for the continuous production of symmetrical hydroentangled non-woven fabrics.

With further reference to the drawings, a view of preferred embodiment of the entangling apparatus 10 is shown in FIG. 1 situated at the output end of a series of conventional carding apparatus C1–C4. The apparatus 10 provides a system for entangling non-woven fibrous materials by a novel fluid entangling process. Particular advantage is obtained when the entangling process of the invention is applied to a non-randomized fibrous web 12.

FIG. 1 illustrates a preferred application of the apparatus 10 in-line with conventional carding apparatus C1–C4 which output machine direction ("MD") oriented carded web to a peeler roller (not shown) and inclined conveyor 14 for processing in the apparatus of the invention. In the preferred embodiment water is employed to hydroentangle and randomize the fibers in the carded web 12 in an entangling station 16 in a manner to be hereinafter described.

Following the entangling process the web is conveyed to a conventional padder 18 and dry can 20 apparatus to provide a finished non-woven fabric for stock rolling on a winder 22.

MECHANISM OF THE ENTANGLING APPARATUS

Figure 3:
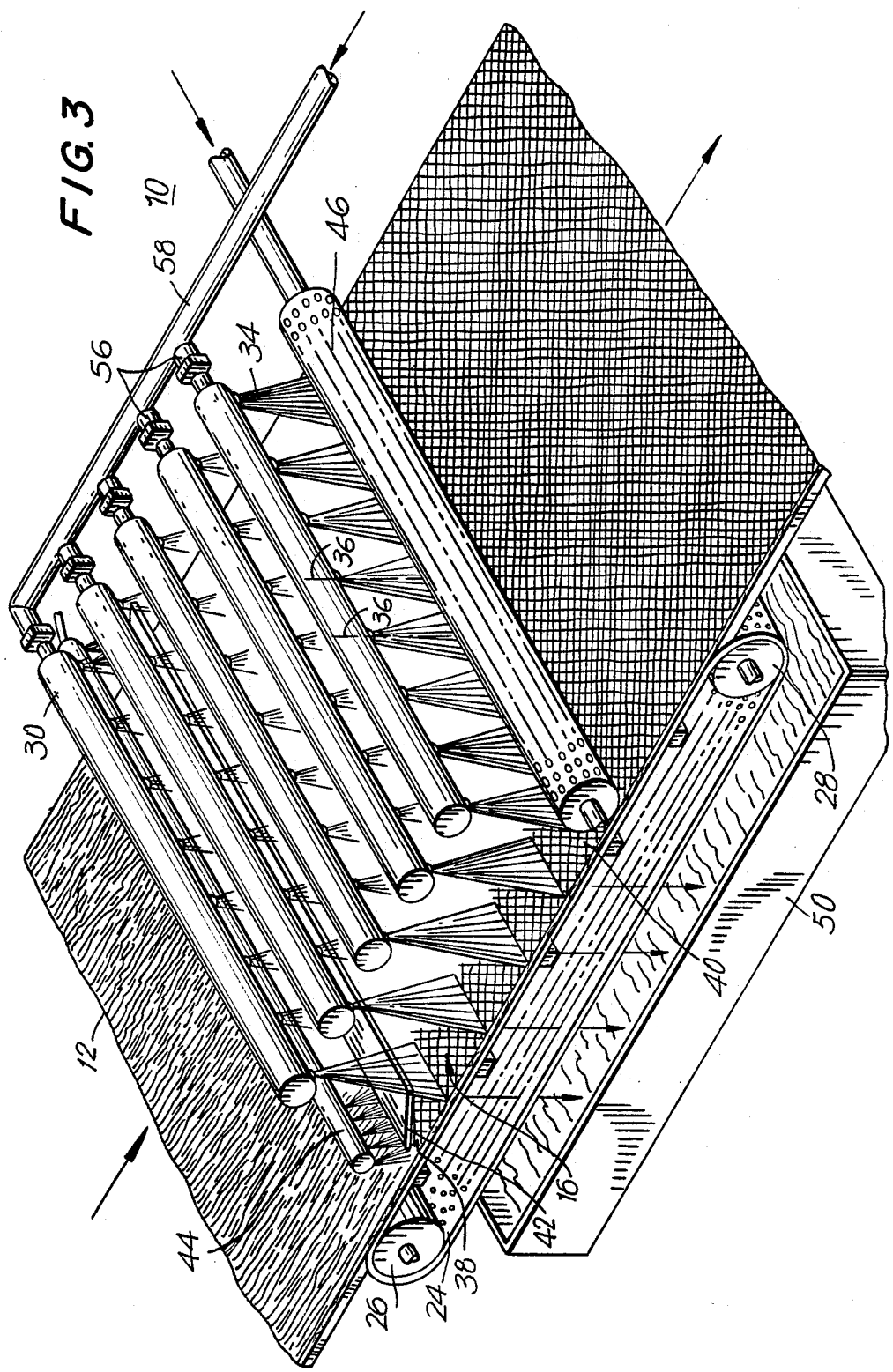
FIG. 3 is an isometric view of the apparatus represented by the hydroentangling entangling station of FIG. 1 showing the manner in which carded web is advanced through an entangling jet fluid curtain supported on a generally planar conveyor and fabric entangling and forming member.

Referring now specifically to the mechanism of the entangling apparatus 10, which is best illustrated in FIG. 3, this unit includes an endless conveyor means for advancing the non-randomized web through the entangling station 16. The conveyor means includes an entangling member 24 which is supported on rollers 26, 28 and drive means (not shown) for rotation of the rollers. Preferred line speeds for the conveyor are in the range of 30 to 500 ft/min.

Figure 6B:
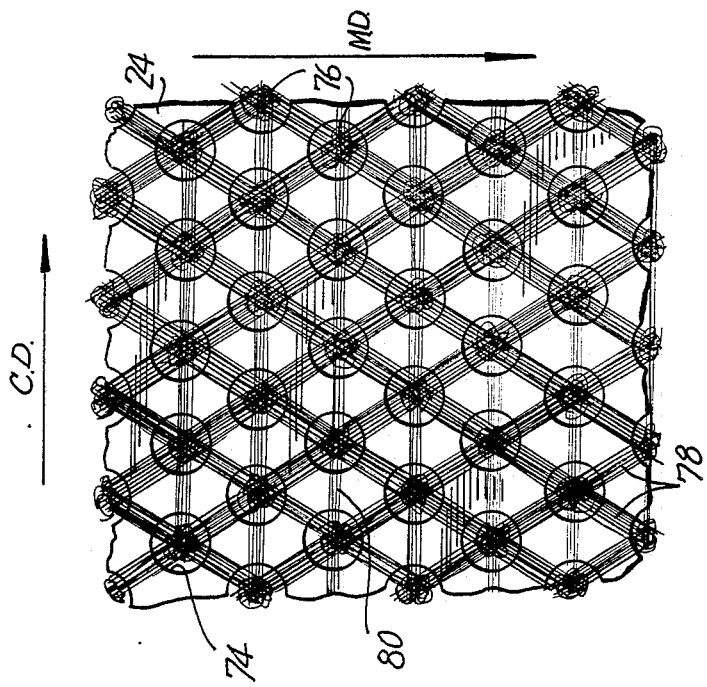
FIG. 6B illustrates the entangled fiber pattern formed on the screen of FIG. 6A employing the hydroentangling apparatus and process of the invention.
Figure 6A:
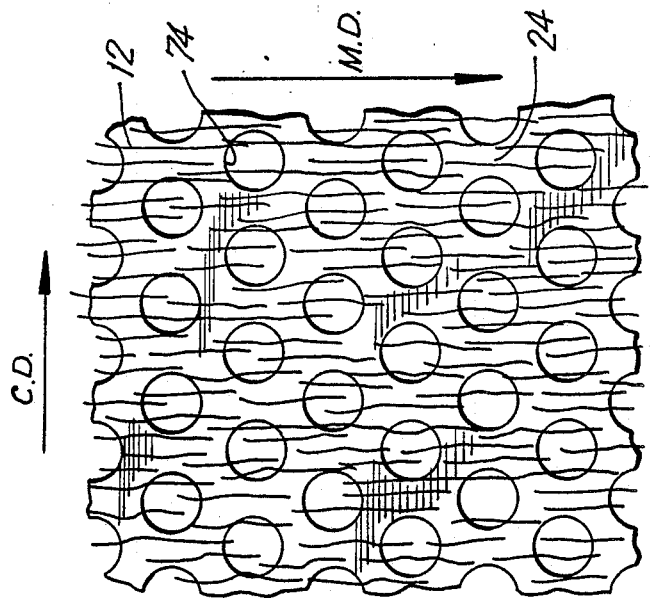
FIG. 6A is a plan view of MD aligned carded web overlying an apertured fabric forming member prior to entanglement of web fibers, the forming screen having an aperture pattern including a larger spacing ratio between MD than CD apertures.
Figure 8:
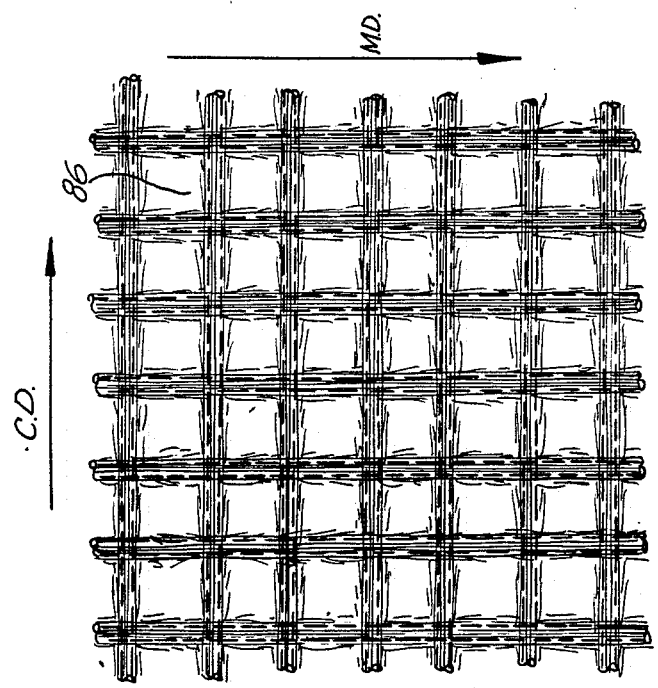
FIG. 8 illustrates an alternative woven entangling member weave structured non-woven fabric produced in accordance with the apparatus and process of the invention.
Figure 7:
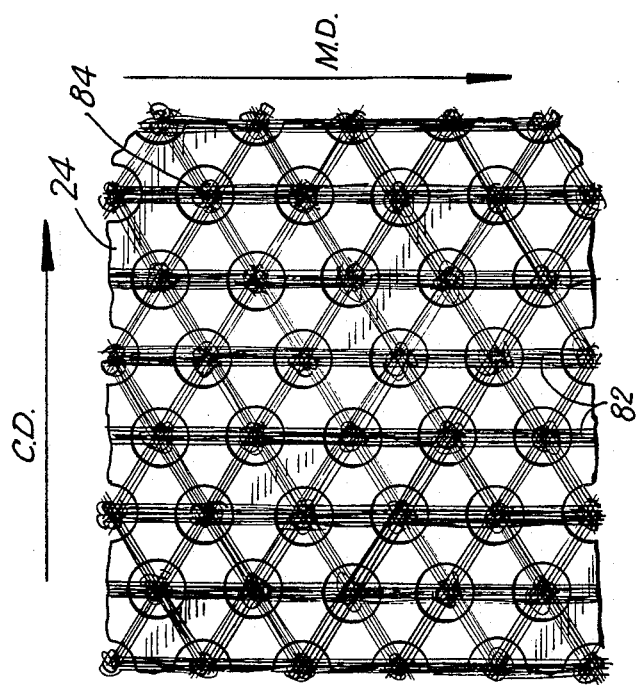
FIG. 7 is an illustration similar to FIG. 6B in which the forming member has an aperture pattern including a larger spacing ratio between CD than MD apertures.

The entangling member 24, which preferably has a planar configuration, includes a symmetrical pattern of void areas which are fluid pervious and define an entangling pattern for the fibrous web 12. In the preferred embodiments, the the void areas occupy at least 25 per cent of the area of the entangling member 24. As will be described in detail below, the entangling member may be provided with a variety of patterns which produce distinct novel fabrics. Representative entangling members are illustrated in FIGS. 6A, 7, and 8.

Mounted above the entangling member 24 is an arrangement of generally parallel spaced manifolds 30 oriented in a cross-direction ("CD") relative to movement of the web. The manifolds 30 which are spaced approximately 4 inches apart are positioned at least 1½ inches and preferably in the range of 3–8 inches above the entangling member. Each manifold 30 includes a plurality of closely aligned and spaced divergent jet nozzles 32.

Preferred manifolds have specifications designed to deliver fluid pressures to the nozzles in the range of 200 to 2500 psi. Advantage in the entangling process is obtained by ramping the manifold pressure in the MD so that increased fluid flows impinge the web as its lattice structure and coherence develop.

In the preferred embodiment the nozzles are spaced approximately 1 inch apart on the manifolds which in turn are positioned 3 to 6 inches above the entangling member 24.

As shown in FIG. 3, the nozzles 32 eject sprays 34 having a divergent fan shaped configuration downwardly onto the web 12 as it is advanced through the entangling apparatus. The close packed manifold arrangement and spacing of the nozzles 32 define a curtain of fluid which continuously impinges upon the web 12 and coacts with the entangling member 24.

The jet sprays 34 diverge in the CD relative to a central nozzle axis 36 which is perpendicular to the web. Experimentation has shown that a divergence angle of approximately 18 degrees yields optimum entanglement and randomization of the web.

To obtain effective entangling the curtain fluid must output energy to the web 12 of at least 0.1 hp-hr/lb and preferably in the range of 0.4–2.0 Hp-hr/lb.

Preferred nozzles 32 for use in the invention are of the type manufactured by Spraying Systems Co., distributed by J. W. Sowden & Associates, P.0. Box 5046, Manchester, N.H. 03108, under product designation 0503-TC. This nozzle has a tungsten carbide spray tip which has been found effective for providing regulated pressure sprays. Ejection orifices in the nozzle have a non-circular shaped configurations. The preferred nozzle has an effective diameter of 0.043 inches and flow of 1.5 gallons/min at an air included jet spray angle of 18° and 1000 psi.

Air entrained by the divergent jet sprays 34 is deflected by the web 12 generating turbulence which lifts the web relative to the entangling member and results in blistering of the web and fabric irregularities. To counterbalance the effect of the entrained air, a control means is provided which includes stabilizing mechanisms at entry and terminal end areas 38, 40 of the entangling station. For example, at the entry area 38, an air curtain means for directing air to the web 12 may be provided to coact with a baffle plate 42 which extends from a position outboard of the fluid curtain upwardly on an angle into the curtain. See FIGS. 3 and 4. The air curtain means includes an air nozzle 44 which directs a continuous curtain of air beneath the baffle 42 to control entrained air in the entry area 38 of the entangling station 16.

To control entrained air at the terminal end area 40, a generally hollow perforated cylindrical roll 46 is spaced above the web 12. Counterclockwise rotation of the roll 46 by a friction drive means dissipates air entrained by the air curtain. Frictional movement of the roll 46 over the web 12 also presses fluid from the web through the entangling member 24.

Figure 4:
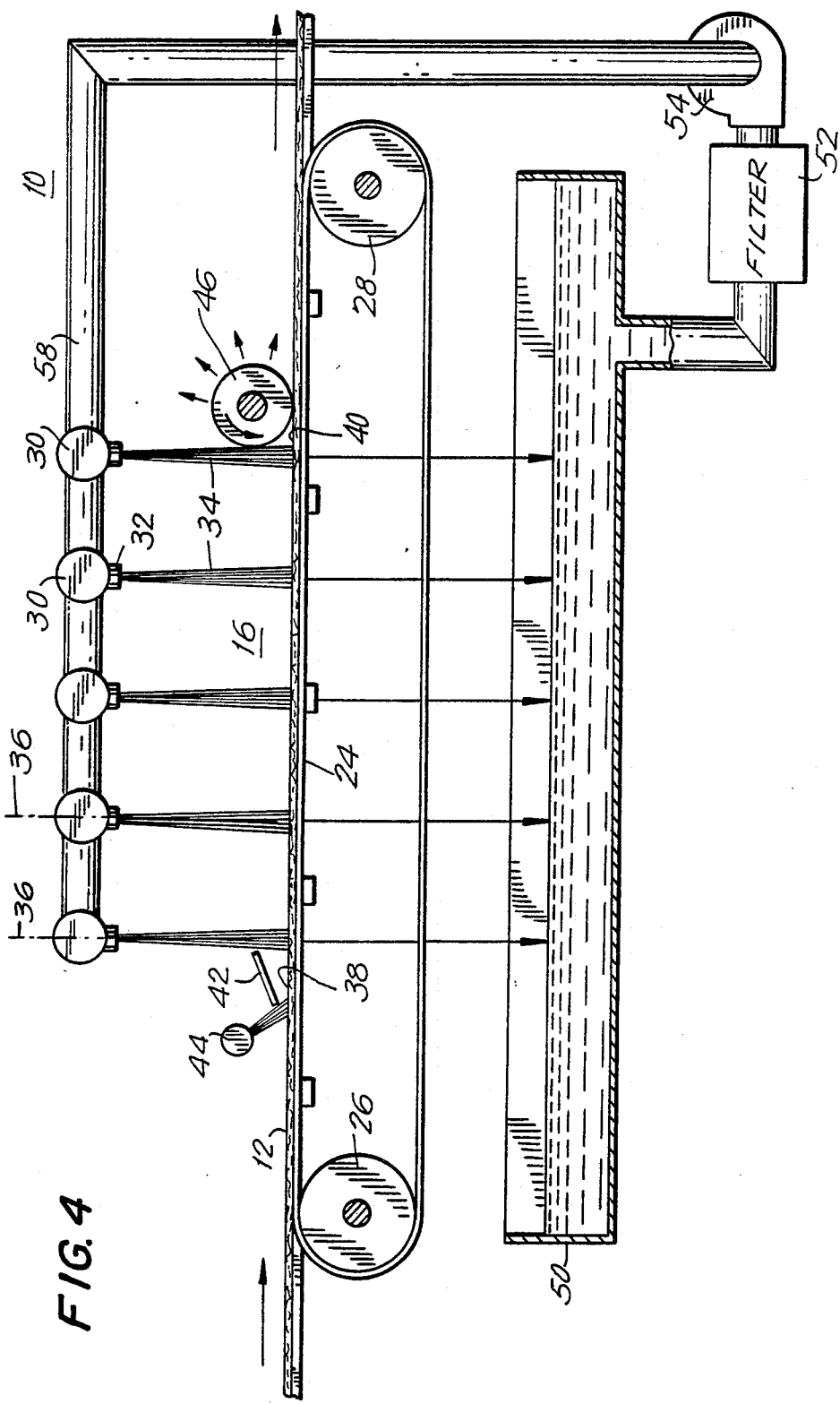
FIG. 4 is a cross-section of the entangling apparatus of FIG. 3 which also includes a schematic illustration of a pumping and filtration system employed in the invention.

Within the entangling station 16 the continuous curtain of aqueous fluid counterbalances the effect of entrained air when the manifolds 30 are arranged in close proximity, e.g., spacing of approximately 3 to 4.5 inches, as illustrated in FIG. 4. Where the manifolds 30 are spaced further apart, it is advantageous to position baffle members 48 between the manifolds 30 which are spaced from the web. See FIG. 9. Baffle members 48 have a generally V-shaped configuration to shield the web 12 from the effects of entrained air. Further advantage can be obtained by perforating the baffle members 48 to enable entrained air to escape. In the arrangment of FIG. 9, the manifolds 30 are spaced approximately 7 inches apart and the baffles 48 extend in the CD of the web.

A collecting tank 50 is located below the entangling member 24 for receiving fluids employed in the entangling process. The collecting tank 50 directs fluids to a filter 52 which removes fiber debris, and a pump 54 for recirculation of fluid to the manifolds 30. Pressure regulators 56 are located on a manifold connecting line 58 to provide controlled nozzle 32 pressures and transfer of energy to the web 12.

Figure 5:
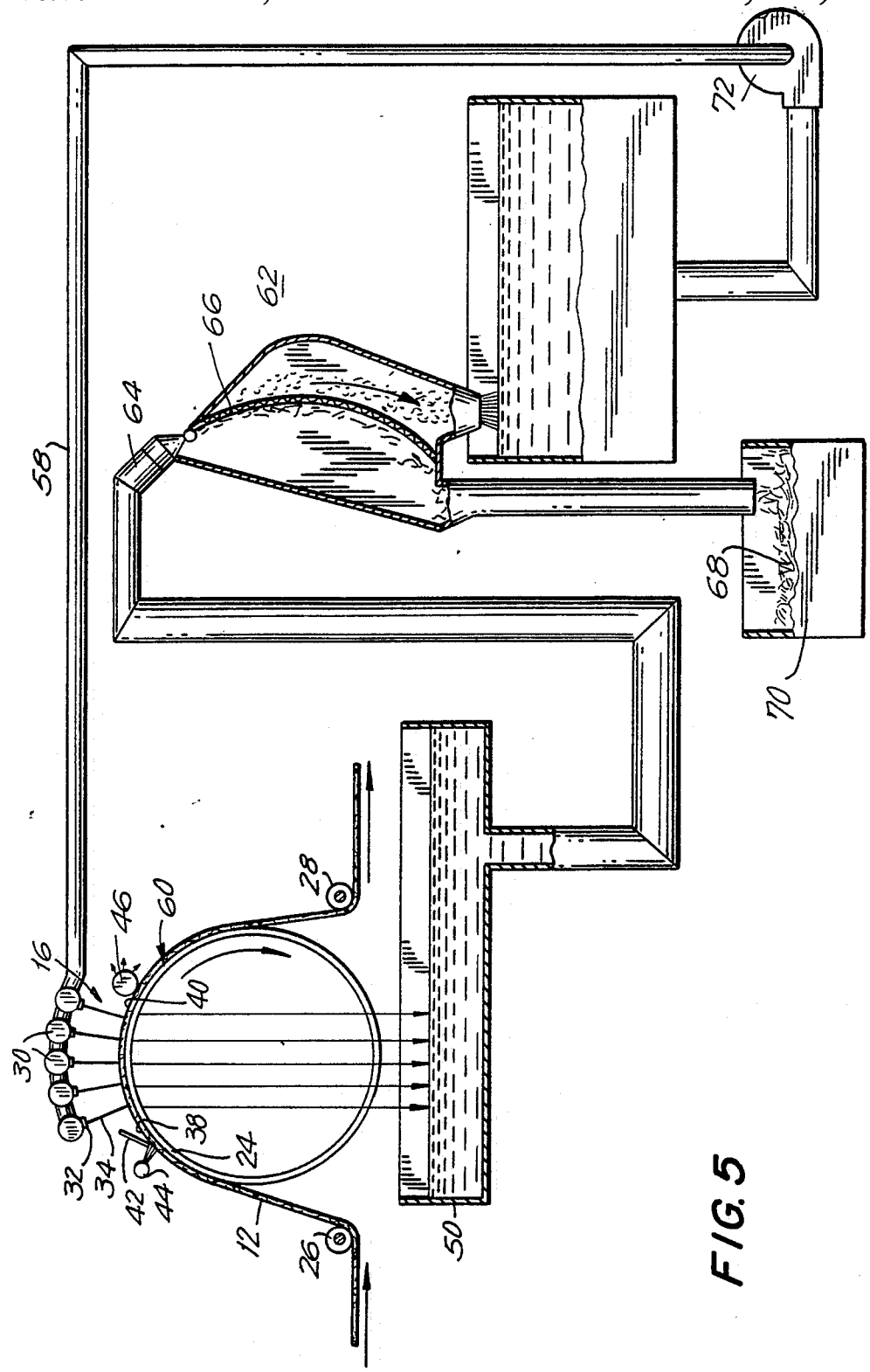
FIG. 5 is a cross-section of an alternative embodiment of the hydroentangling apparatus in which an entangling member having a cylindrical configuration is substituted for the generally planar conveyor and fabric forming member of FIG. 3.

An alternative conveyor means structure is illustrated in FIG. 5 which includes a cylindrical entangling member 60. In other respects, this embodiment functions in the manner of the planar entangling member systems of FIGS. 3 and 4. Manifolds 30 are stacked in close proximity spaced from the entangling member 60, and the control means of FIG. 3 is provided to dissipate and counteract air entrained at the web surface.

FIG. 5 also illustrates a preferred filtration system which may be employed in the invention. The filtration system is of the type manufactured by Dorr Oliver Inc., 77 Havemeyer Lane, Stamford, Conn. 06900, and offered under product designation 120° DSM SCREEN. The DSM system includes a dispensing nozzle 64 and filter screen 66 which directs fiber debris 68 into discharge receptacle 70 and filtered fluid to a pump 72 for recirculation to the manifolds 30. Filter screen 66 employs an arrangement of slats.

METHOD OF THE INVENTION

Figure 2:
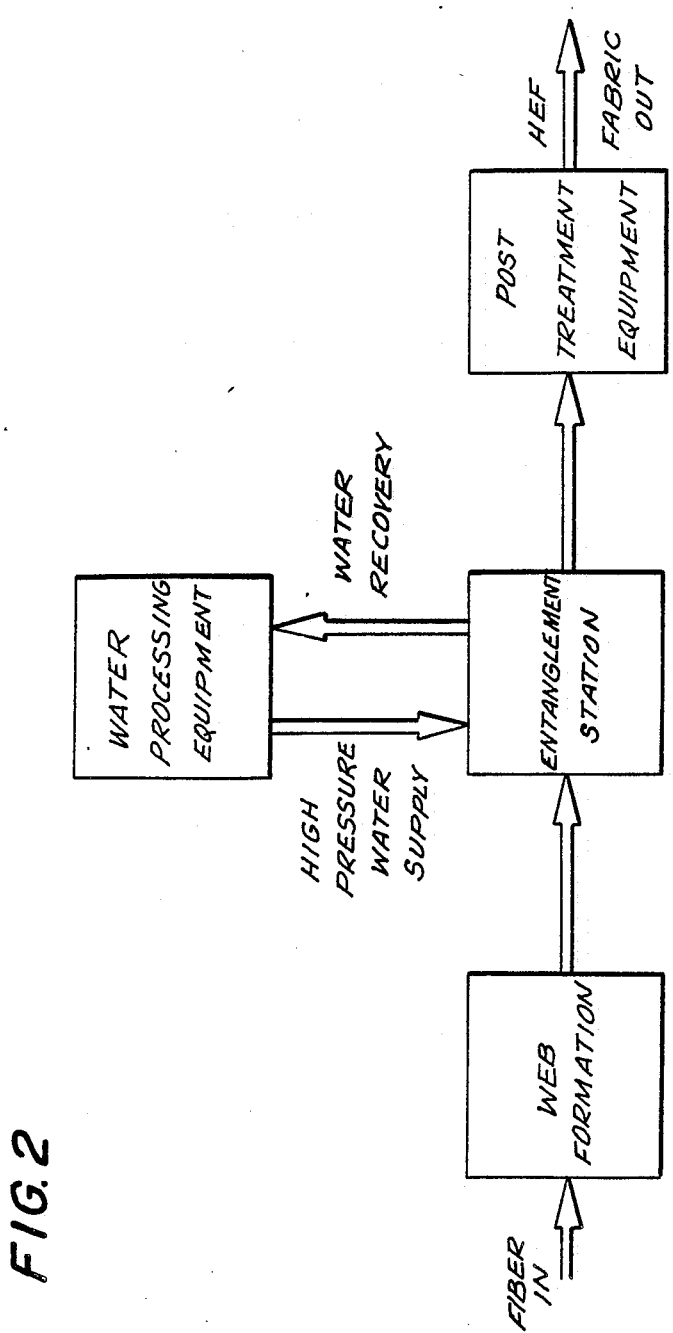
FIG. 2 is a schematic illustration of the hydroentangling process of the invention.

As illustrated in the schematic diagram of FIG. 2, the non-randomized web 12 is advanced to an entanglement station and then to conventional treatment stations to produce hydroentangled fabric. In accordance with the entangling process of the invention, a curtain of divergent jets impinge upon the web 12 to randomize and intertwine fibers in the web into a coherent lattice pattern which approximates an isotropic configuration. It is a feature of the invention to provide an entangling member 24 having a pattern of voids which coact with divergent jet sprays 34 to produce novel fabric. Divergent jets 34 yield a preferred fabric when the void areas of the entangling member occupy at least 25 per cent of the member.

FIG. 6A illustrates a preferred entangling member 24 which includes a plurality of symmetrical apertures 74 arranged so that the spacing between MD apertures is greater than CD apertures. For example, the apertures may have diameters of 1/16 inch and a center to center staggered aperture spacing of 3/32 inch. The MD and CD apertures respectively have center to center spacings of 0.16 and 0.092 inches. An entangling member 24 having this aperture configuration produces the fabric illustrated in FIGS. 10A and B in accordance with process parameters described in Example 1.

Comparison of FIGS. 6A and B illustrates the manner in which entangling of web fibers is achieved with the apparatus and process of the invention. MD oriented web 12 shown in FIG. 6A is advanced through the entangling station to yield the symmetrical diamond shaped randomized and entangled structure of FIG. 6B.

Figure 10A:
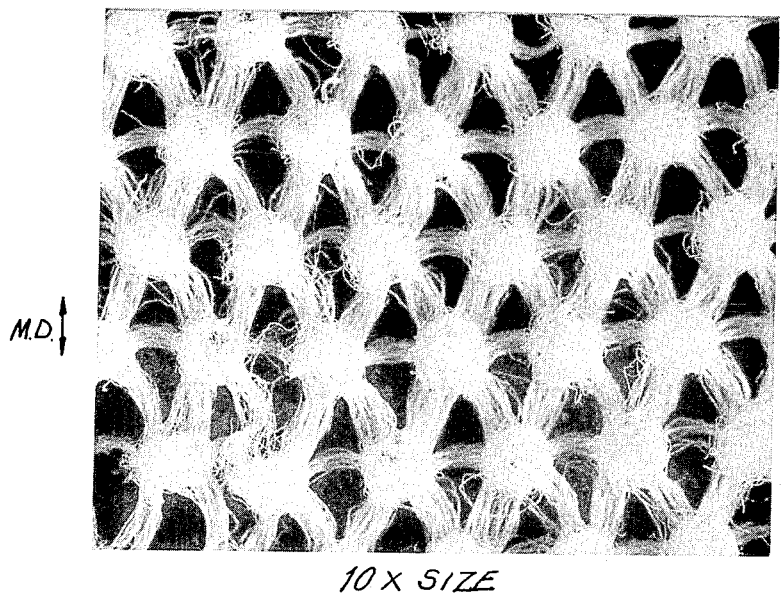
FIGS. 10A and B are photographs at 10× magnification of a hydroentangled non-woven cotton fabric produced as disclosed in Example 1 on the apertured entangling member illustrated in FIGS. 6A and 6B.
Figure 10B:
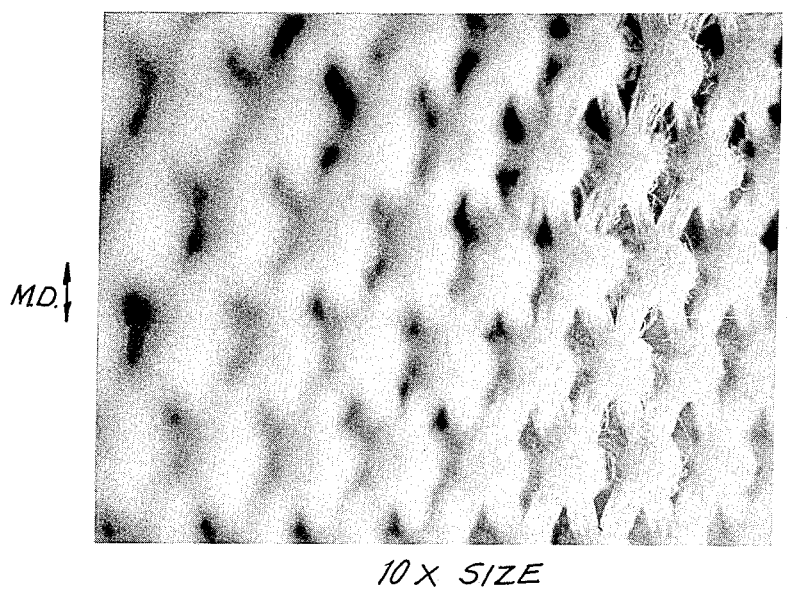
Figure 11A:
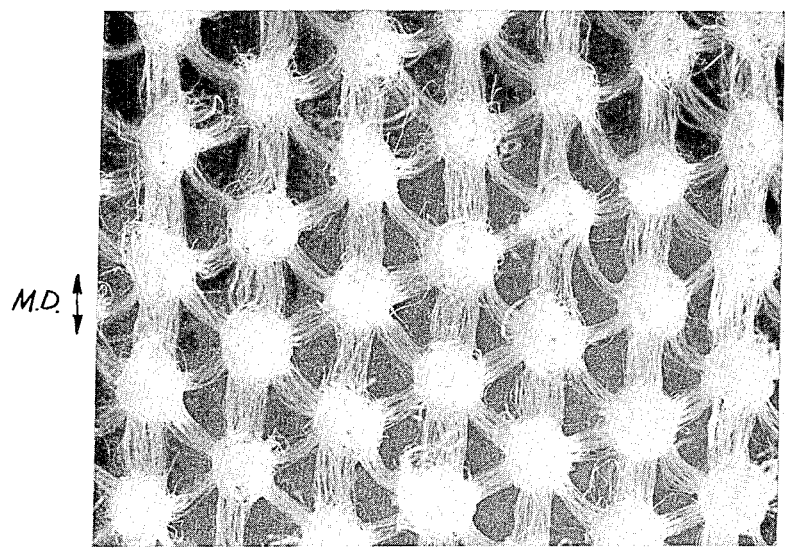
FIGS. 11A and B are photographs at 10× magnification of a hydroentangled non-woven cotton fabric produced as disclosed in Example 3 on the apertured entangling member illustrated in FIG. 7.
Figure 11B:
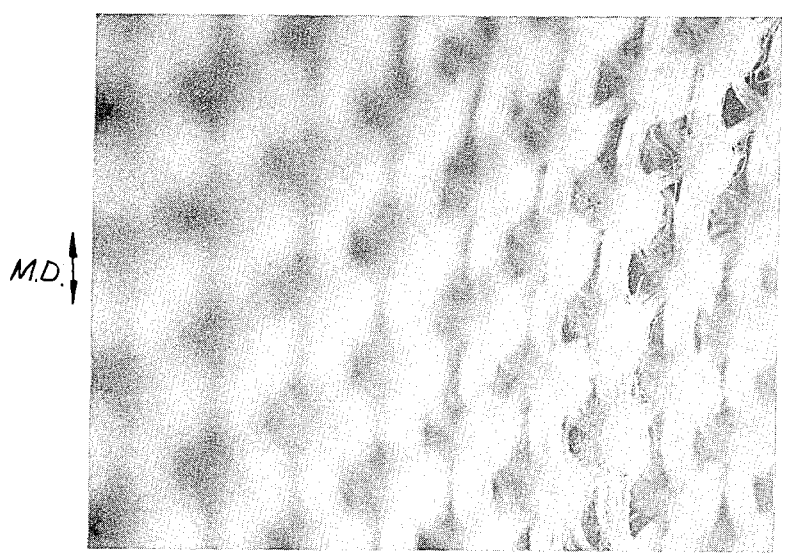

Non-woven fabric produced by this process and entangling member 24 of FIG. 6A has a generally uniform tensile strength including, dense nodes 76 formed in the apertures 74 by migrating fibers, and spaced parallel rows of criss-crossing fibrous bands 78 which intersect the nodes 76. The nodes are also connected by CD oriented interstitial fibers 80 which further enhance CD tensile strength of the fabric. FIGS. 10A and B are photographs at 10× magnification of a non-woven cotton fabric produced on the FIG. 6A screen. The magnified view of the fabric shows the coherent and uniform lattice structure in which essentially all loose fiber ends are entangled within the nodes 76.

In accordance with the process of the invention, the curtain of divergent jet sprays 34 are directed onto the web passing through void areas in the entangling member 14. Simultaneously, the conveyor means advances the web 12 so that it traverses the divergent jet curtain and fibers in the web. Combination of the divergent jet sprays 34 and continuously moving entangling member 24 subjects the web 12 to vector forces in machine and cross directions which randomize and entangle web fibers.

Alternative entangling members are illustrated in FIGS. 7 and 8. The entangling member 24 of FIG. 7 is similar to the aperture arrangement of FIGS. 6A and B except that the spacing between apertures is greater in the cross than machine directions. For example, as set forth in Example 3, MD and CD apertures, respectively, may have center to center spacing of 0.092 and 0.160 inches. Apertures in this entangling member 24 are dimensioned and staggered to the specifications of the FIG. 6A member. This aperture pattern yields a diamond shaped lattice pattern characterized by dense MD aligned fibrous bands 82 which connect dense nodes 84. This structure has particular advantage where superior MD tensile strength is required in that it limits fabric necking in associated with an MD load which pulls the patterned fabric from the entangling screen.

FIG. 8 illustrates an entangling member 24 in the form of a conventional wire woven screen 86 having a mesh spacing of 12 wires/inch in the machine and cross directions, a wire diameter of 0.030 inches, and an open area of 41 per cent. Use of such a screen in the process of this invention yields a structure having a woven appearance which corresponds to the configuration of the screen. See Examples 7 and 8. The divergent jet sprays 34 of the fluid curtain entangle web fibers so that they migrate to overlie the mesh pattern of the screen.

Examples 1–8 and corresponding FIGS. 10–15 describe and illustrate representative cotton fabrics produced by the method of the invention employing entangling members 24 having planar and cylindrical configurations and the spaced manifold arrangement of FIGS. 3 and 5.

For these applications five stainless steel manifolds 30 having diameters of 2.5 inches were spaced apart at center to center distances of 4 inches and 6 inches above the web. Each manifold 30 was equipped with 20 divergent jet nozzles 32 on 1 inch centers. Each nozzle had an equivalent diameter of 0.043 inches and a delivery rate of 1.5 gallons of water per minute at a pressure of 1000 psi. The spray pattern width at a one foot distance was approximately 4 inches. It should be noted that these conditions were simulated in certain of the Examples through use of a single manifold which traversed an entangling member at successive intervals. See Examples 2–6 and 8.

In accordance with the method of the invention, the Examples employ webs of predominantly MD fibers prepared using a conventional carding system equipped with peeler rolls. The web consisted of No. 2 comber bleached non-continuous staple cotton fibers.

Energy output of the entangling water curtain in the Examples is calculated in accordance with the following equation:

$$E = \frac{14.2 \, C \, D^2 \, P^{1.5} \, N}{SW}$$

where
E = Hp-hr/lb fiber
C = Jet discharge coefficient (dimensionless)
D = Orifice diameter (inches)
P = Manifold pressure (psi)
N = Jet density (jets/inch)
S = Line speed (feet/minute)
W = Basis weight (grams/square yard)
where, the jet discharge coefficient (C) was taken as follows:

| Pressure (psi) | Discharge Coefficient (C) (dimensionless) |
|---|---|
| 200 | * 0.64 |
| 300 | 0.74 |
| 400 | 0.81 |
| 500 | 0.85 |
| >500 | 0.85 |

A representative computation is set forth in Table I for a cotton fabric produced in the Example 2 hydroentangling application of the invention (see description below). This Example yielded an entangled 24.5 gram/square yard (gsy) cotton fabric characterized by an MD/CD ratio of 2.0:1, MD/CD grab tensile strengths of 7.3/3.5 lbs/inch.

TABLE I

| Manifold | Pressure (psi) | Flow/Man (gall/in) | Energy/Man (hp-hr/lb fiber) | Total Energy |
|---|---|---|---|---|
| 1 | 300 | 0.707 | 0.069 | 0.069 |
| 2 | 500 | 0.999 | 0.162 | 0.230 |
| 3 | 700 | 1.241 | 0.281 | 0.512 |
| 4 | 900 | 1.407 | 0.410 | 0.922 |

TABLE I-continued

| Manifold | Pressure (psi) | Flow/Man (gall/in) | Energy/Man (hp-hr/lb fiber) | Total Energy |
|---|---|---|---|---|
| 5 | 1100 | 1.550 | 0.554 | 1.475 |

Total Energy is computed by calculating energy output for each manifold and adding the resulting energies.

Characteristics of fabrics illustrated in FIGS. 10-15 are set forth in the Examples:

EXAMPLE 1

A diamond structured cotton fabric of type illustrated in FIGS. 10A and B was produced employing a cylindrical entangling member having the apertured configuration of FIG. 6A. The entangling member included 1/16 inch diameter apertures on 3/32 inch centers with apertures staggered to form an equilateral triangle. MD and CD apertures, respectively, were provided with center to center spacing of 0.16 and 0.092 inches.

A hydroentangling apparatus illustrated in FIGS. 1 and 5 was employed at a process speed of 40 feet/minute. Web from the carding apparatus and peeler rollers was advanced to the entangling station 16 and onto the entangling member 24 where it was wetted down and then hydroentangled. Manifold pressures were ramped with the first manifold set at 150 psi and successive manifolds having pressures of 300, 500, 700 and 900 psi.

The entangled web was advanced to padder 18, and dry cans having a steam pressure of 80 psi to provide a coherent fabric structure having an MD/CD ratio of 2.5:1, weight of 38 gsy, and grab tensile strength in machine and cross directions of 5.6 and 2.2 lbs/in.

EXAMPLE 2

Fabric similar to the that illustrated in FIGS. 10A and B and described in Example 1 was produced on a planar entangling member 24 employing the apparatus of FIGS. 1 and 3. Specifications for the entangling member 24 were identical to the apertured screen of Example 1.

The packed manifold arrangement of FIG. 3 was simulated on a prototype system by successively traversing the web beneath a single manifold at pressures of 300, 500, 700, 900 and 1100 psi at a process speed of 60 feet per minute.

The resulting fabric structure was characterized by an MD/CD ratio of 2.0:1, weight of 24.5 gsy, and grab tensile strength in machine and cross directions of 7.3 and 3.5 lbs/in.

EXAMPLE 3

Fabric having the characteristics illustrated in FIBS. 11A and B was produced employing the prototype system and process conditions of Example 2. Apparatus in this Example differed in that the planar apertured entangling member was shifted 90 degrees to orient apertures so that the spacing between MD apertures was greater than CD apertures. MD and CD apertures, respectively, had center to center spacings of 0.092 and 0.16 inches. See FIG. 7.

This Example produced a diamond structured non-woven fabric with predominant MD yarns which are capable of bearing higher MD loads without necking than fabrics of Examples 1 and 2.

The resulting fabric structure was characterized by an MD/CD ratio of 1.7:1, weight of 25.5 gsy, and grab tensile strength in machine and cross directions of 7.0 and 4.1 lbs/in.

EXAMPLE 4

Figure 12:
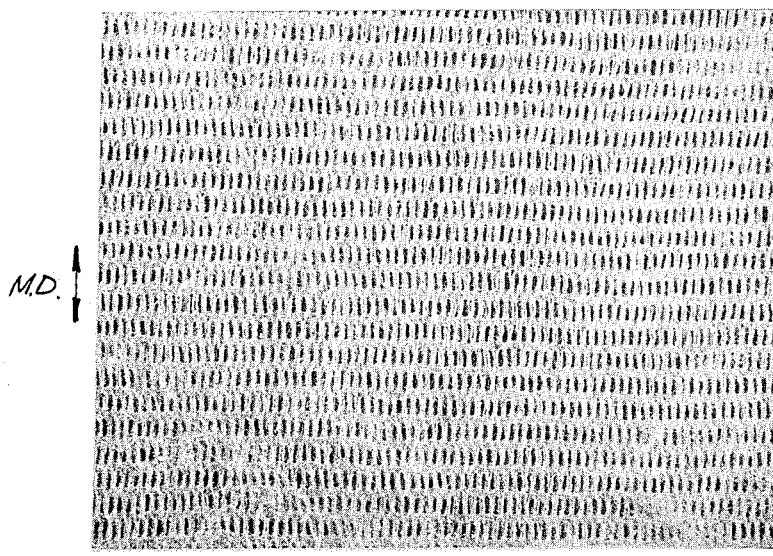
FIG. 12 is a photograph at 1.8× magnification of a hydroentangled non-woven cotton fabric produced as disclosed in Example 4 on a planar fine mesh reverse dutch woven screen (not illustrated)

The ribbed fabric illustrated in FIG. 12 was produced on a planar reverse dutch woven entangling entangling member employing the prototype apparatus and processing conditions described in Example 2—process line speed of 60 feet/minutes and manifold pressures ramped between 300 and 1100 psi. The reverse dutch entangling member includes a fine mesh including 12 wires/inch in the cross-direction (0.022" diameter) and 68 wires/inch in the machine direction (0.015" diameter).

The ribbed fabric produced in this Example is characterized by CD ribs and connecting interstitial fibers which provide a superior wipe material.

EXAMPLE 5

Figure 13:
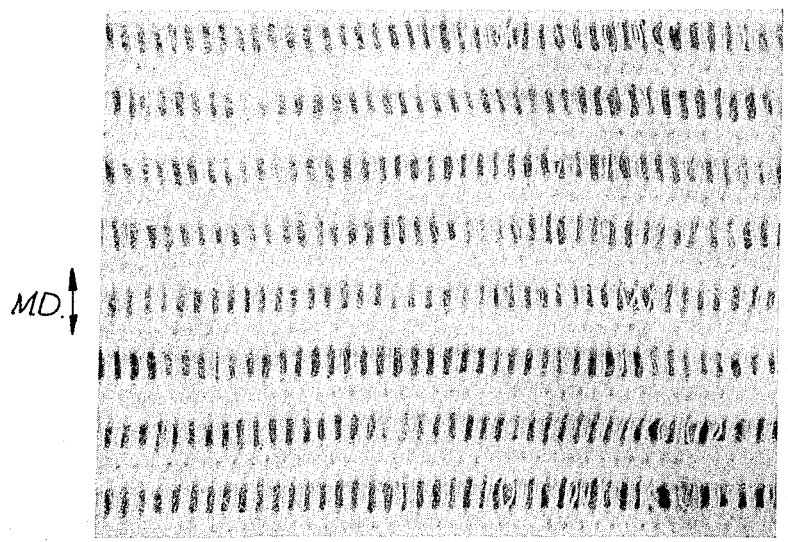
FIG. 13 is a photograph at 1.8× magnification of a hydroentangled non-woven cotton fabric produced as disclosed in Example 5 on a planar mesh reverse dutch screen (not illustrated)

An alternative ribbed non-woven, illustrated in FIG. 13, was produced in the manner described in Example 4 employing a coarse mesh reverse dutch entangling member. This screen includes 0.085 inch diameter wires arranged in the cross-direction with a spacing of 4 wires/inch, and 0.15 inch diameter wires positioned between the 0.085 inch wires. The screen also includes machine direction wires having a 0.015 inch diameter and spacing of 60 wires/inch.

EXAMPLE 6

Figure 14:
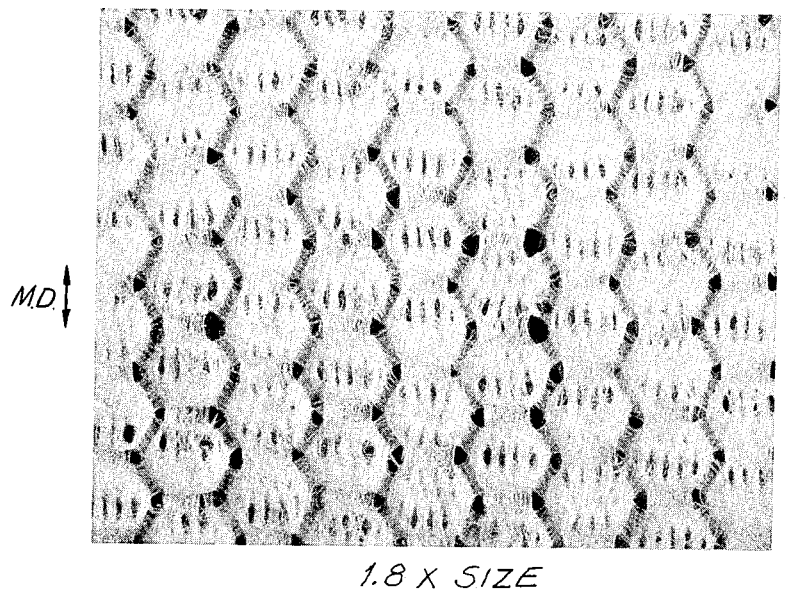
FIG. 14 is a photograph at 1.8× magnification of a hydroentangled non-woven cotton fabric produced as disclosed in Example 6 on a planar woven screen overlaid with a hexagonal screen (not illustrated)

A hexagon patterned non-woven fabric, illustrated in FIG. 14, was produced in accordance with the process conditions of Example 2—process line speed of 60 feet/minute and manifold pressures ramped between 300 to 1100 psi. The entangling member included the planar reverse dutch woven screen described in Example 4 overlaid with a perforated metal screen having a hexagon pattern. The hexagons of the metal screen were defined by ¼ inch flats separated by 1/16 inch wide surrounding metal areas.

EXAMPLE 7

Figure 15:
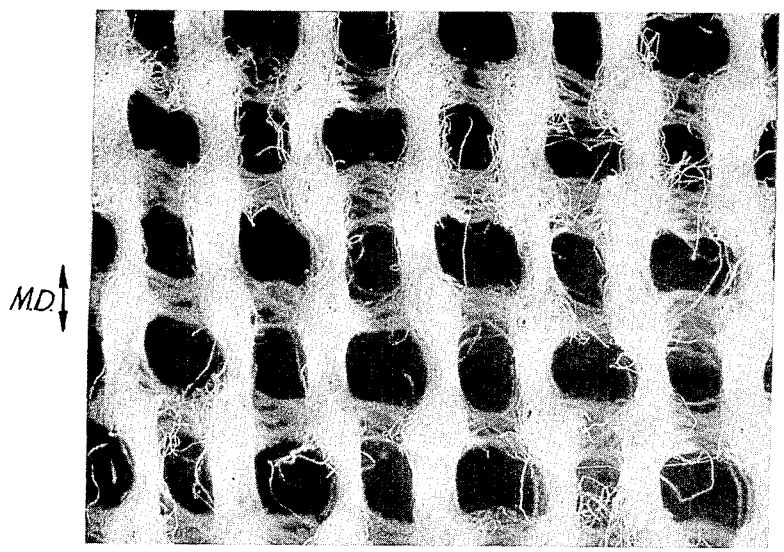
FIG. 15 is a photograph at 10× magnification of a hydroentangled non-woven cotton fabric produced as disclosed in Examples 7 and 8 on the woven forming screen illustrated in FIG. 8.

A predominantly machine direction oriented fabric, similar the fabric illustrated in FIG. 15, was produced on a cylindrical 12×12 woven wire entangling member under the process conditions of Example 1—process speed of 40 feet/minute and ramped manifold pressures ranging from 150 to 900 psi. The woven screen, which was of the type illustrated in FIG. 8, had a wire diameter of 0.030 inches and open void areas which formed 41 per cent of the screen.

The hydroentangled fabric of this example had the following properties: MD/CD ratio of 3.9:1, weight of 33 gsy, and grab tensile strength in machine and cross directions of 3.4 and 0.9 lbs/in.

EXAMPLE 8

The fabric of this is similar to Example 7 and fabric illustrated in FIG. 15. The woven screen of Example 7 was provided with a planar configuration and employed under the process conditions of Example 2—line speed of 60 feet/minute and manifold pressures ramped between 300 and 1100 psi.

The hydroentangled fabric of this example had the following properties: MD/CD ratio of 1.5:1, weight of 22.5 gsy, and grab tensile strength in machine and cross directions of 3.9 and 2.6 lbs/in.

Table II summarizes the test results discussed in the Examples:

TABLE II
Summary of Test Results

| Example | Screen Type | Weight (gsy) | Grab Tensile (lbs/in) MD | CD | MD/CD Ratio |
|---|---|---|---|---|---|
| 1 | Perforated 1/16 dia on 3/32 crs | 38 | 5.6 | 2.2 | 2.5:1 |
| 2 | Perforated 1/16 dia on 3/32 crs | 24.5 | 7.3 | 3.5 | 2.0:1 |
| 3 | Perforated 1/16 dia on 3/32 crs | 25.5 | 7.0 | 4.1 | 1.7:1 |
| 7 | Woven 12 × 12 - 90 | 33 | 3.4 | 0.9 | 3.9:1 |
| 8 | Woven 12 × 12 - 90 | 22.5 | 3.9 | 2.6 | 1.5:1 |

From the foregoing, it will be appreciated that the invention achieves the objects stated heretofore. An entangling apparatus 10 of uncomplex design is provided which entangles a non-randomized web 12 of fibrous material employing divergent jet sprays 34 and a coacting entangling member 24. Advantage is obtained in the invention by use of jet sprays 34 which have wide orifice openings as compared to conventional columnar jet nozzles. Such nozzles do not clog with fiber debris as is the case with prior art columnar nozzles which have small diameters. As a consequence, filtration systems employed in the invention require less exacting specifications than in prior art entangling systems.

Further advantage is obtained in the invention through use of a system which does not require web randomization apparatus. Random airlay and scrambling systems of the prior art are dispensed with. The entangling apparatus 10 randomizes and scrambles the web without requirement of these processing steps.

It will be recognized by those skilled in the art the apparatus and process of the invention have wide application in the production of a diversity of patterned non-woven fabrics with characteristics determined by the design and specifications of entangling members 24. For example, the cotton fabrics illustrated in the Examples have particular application as low cost gauze fabric substitutes.

Numerous modifications are possible in light of the above disclosure. For example, the preferred process of the invention employs water as the entangling medium. Other fluids including binders may be introduced into the fabric in the entangling process. Similarly, although selected entangling members 24 are illustrated in the drawings, it will be recognized that other configurations are within the scope of the invention.

Therefore, although the invention has been described with reference to certain preferred embodiments, it will be appreciated that other entangling apparatus, processes and non-woven fabrics may be devised, which are nevertheless within the scope and spirit of the invention as defined in the claims appended hereto.

We claim:

1. An apparatus for entangling a non-woven fibrous web by impacting the web with pressurized fluid jets, the web including a plurality of fibers, the apparatus comprising:
    conveyor means for conveying the non-woven fibrous web in a machine direction ("MD") through an entangling station, said entangling station including entry and terminal end areas, said conveying means supporting an entangling member which underlies the non-woven fibrous web, said entangling member including a symmetrical pattern of void areas which are fluid pervious;
    curtain means disposed above the conveyor means for directing a continuous curtain of the fluid downwardly through the non-woven web and said entangling member in said entangling station, said curtain including a plurality of nozzles which eject divergent jets; and
    control means for controlling dispersion of air entrained by said curtain, said control means including means for directing an air curtain onto the web in said entry area;
    so that said curtain coacts with said entangling member to randomize, entangle and intertwine the web fibers.

2. An apparatus as set forth in claim 1, wherein said void areas occupy at least 25 per cent of the area of said entangling member.

3. An apparatus as set forth in claim 1, wherein said divergent jets have a spray pressure of at least 200 psi.

4. An apparatus as set forth in claim 1, wherein said void areas occupy at least 25 per cent of the area of said entangling member, and said divergent jets have a spray pressure of at least 200 psi.

5. An apparatus as set forth in claim 4, wherein said curtain outputs energy of at least 0.1 hp-hr/lb to the web.

6. An apparatus as set forth in claim 1, wherein said divergent jets have an angle of divergence of at least 2 degrees.

7. An apparatus as set forth in claim 1, wherein the spray pressure of said divergent jets is ramped in the MD over a pressure range of 200–2500 psi.

8. An apparatus as set forth in claim 7, where said divergent jets diverge in a cross-direction ("CD") relative to the MD and have an angle of divergence of at least 2 degrees.

9. An apparatus as set forth in claim 8, wherein said curtain means is spaced at least 1½" inches above said entangling member.

10. An apparatus as set forth in claim 1, wherein said entangling member is configured in the form of a generally cylindrical drum.

11. An apparatus as set forth in claim 1, wherein said entangling member has a generally planar exterior surface.

12. An apparatus as set forth in claim 10, wherein said randomization provides MD and cross-direction ("CD") oriented fibers in the web, and wherein said void areas include a plurality of apertures arranged so that the MD apertures are spaced further apart than CD apertures.

13. An apparatus as set forth in claim 12, wherein said apertures occupy at least 25 per cent of the area of said entangling member, and said jets have an angle of divergence of at least 2 degrees.

14. An apparatus as set forth in claim 10, wherein said randomization provides MD and cross-direction ("CD") oriented fibers in the web, and said void areas include a plurality of apertures arranged so that CD apertures are spaced further apart than MD apertures.

15. An apparatus as set forth in claim 14, wherein said apertures occupy at least 25 per cent of the area of said entangling member and said divergent jets have CD oriented angles of divergence of at least 2 degrees.

16. An apparatus as set forth in claim 1, wherein said control means includes a baffle plate positioned in said entry area spaced above the web, said air curtain means and baffle coacting to shield and counterbalance back pressure applied to the web by air which is entrained by said fluid curtain in said entry area.

17. An apparatus as set forth in claim 1, wherein said control means includes a generally hollow perforated cylindrical roll spaced from and disposed above the web in said terminal end area for frictional contact with the web, and means for rotating said cylindrical roll to dissipate entrained air in said terminal end area.

18. An apparatus as set forth in claim 17, wherein said control means further includes a baffle plate positioned in said entry area spaced above the web, said air curtain means and baffle coacting to shield and counterbalance back pressure applied to the web by air entrained in said entry area by said fluid curtain.

19. An apparatus as set forth in claim 1, wherein said fluid curtain means includes a plurality of generally parallel spaced manifolds arranged in said entangling station, said manifolds being arranged in a cross-direction ("CD") which is generally perpendicular to said MD, each manifold including a plurality of said divergent jets.

20. An apparatus as set forth in claim 19, wherein said divergent jets include orifices each having a central vertical axis which is generally perpendicular to the web, said entangling member has a generally planar exterior surface which underlies the web, and said divergent jets have a spray pressure of at least 200 psi.

21. An apparatus as set forth in claim 20, wherein said divergent jets have an angle of divergence relative to said central axis of at least 2 degrees.

22. An apparatus as set forth in claim 20, wherein said curtain means further includes means for recirculating fluid passing through said entangling member to said manifolds.

23. An apparatus for entangling a non-woven fibrous web by impacting the web with pressurized fluid jets, the web including a plurality of staple fibers, the apparatus comprising:
  conveyor means for conveying the non-woven fibrous web in a machine direction ("MD") through an entangling station, said entangling station including entry and terminal end areas, said conveying means supporting a generally planar entangling member which underlies the non-woven fibrous web, said entangling member including a symmetrical pattern of apertures which are fluid pervious, said apertures occupying at least 25 per cent of the area of said entangling member;
  curtain means disposed above the conveyor means for directing a continuous curtain of the fluid downwardly through the non-woven web and said entangling member in said entangling station, said curtain including a plurality of nozzles which eject divergent jets each having an angle of divergence of at least 2 degrees and;
  control means for controlling dispersion of air entrained by said curtain, said control means including means for directing an air curtain onto the web in said entry area;
  so that siad curtain coacts with said entangling member to randomize the web fibers, said fibers entangling together and migrating to apertures in said entangling member to form nodes which are connected by interstitial fibers.

24. An apparatus as set forth in claim 23, wherein said nozzles each include a shaped orifice having an effective diameter of 0.043 inches and a flow of 1.5 gallons/min at 1000 psi.

25. An apparatus as set forth in claim 24, wherein said randomization provides MD and cross-direction ("CD") oriented fibers in the web, and said apertures are arranged so that the spacing ratio of MD apertures is greater than CD apertures.

26. An apparatus as set forth in claim 25, wherein said fluid curtain means includes a plurality of generally parallel spaced manifolds arranged in said entangling station, said manifolds being disposed in said CD orientation relative to the web, each, manifold including a plurality of said nozzles.

27. An apparatus as set forth in claim 26, wherein said manifolds are spaced approximately 4 inches apart, said nozzles each have a central vertical axis which is generally perpendicular to the web, and said nozzles are spaced approximately 1 inch apart.

28. An apparatus as set forth in claim 26, wherein the spray pressure of said divergent jets is ramped in the MD over a range of 200–2500 psi, and said manifolds are spaced 3–8 inches above said entangling member.

29. An apparatus as set forth in claim 26, wherein said control means further comprises:
  a baffle plate positioned in said entry area and spaced above the web which coacts with said air curtain means to counterbalance air entrained by said fluid curtain, and
  a generally hollow perforated cylindrical roll spaced from and disposed in frictional contact with the web in said terminal end area to dissipate entrained air in said terminal end area through said perforations.

30. An apparatus as set forth in claim 29, wherein said curtain means further includes means for recirculating fluid passing through said entangling member to said manifolds, said recirculation means including means for filtering debris from the recirculating fluid.

31. An apparatus as set forth in claim 29, wherein said curtain transfers energy of at least 0.1 hp-hr/lb to the web.

32. A method for entangling a web including a plurality of fibers to produce non-woven fabrics having a symmetrical entangled lattice structure employing divergent jets which form a curtain of fluid, the method comprising the steps of:
  (a) supporting the web on an entangling member in an entangling station which includes entry and terminal end areas, said entangling member including a symmetrical pattern of void areas which are fluid pervious;
  (b) directing the curtain of fluid downwardly through the web and said void areas, and traversing the web with the curtain until the fibers are randomized and entangled to produce a non-woven fabric having a structure determined by said entangling member; and
  (c) dispersing air entrained in the web by the curtain of fluid to maintain the web in contact with said entangling member by directing an air curtain onto the web in said entry area.

33. The method of claim 32, wherein the curtain impinges upon the web at a pressure of at least 200 psi.

34. The method of claim 32, wherein said void areas occupy at least 25 per cent of the area of said entangling member.

35. The method of claim 32, wherein the divergent jets provide fluid streams having a divergence upon impact with the web of at least 2 degrees.

36. The method of claim 35, wherein the curtain outputs energy of approximately 0.1 hp-hr/lb to the web.

37. The method of claim 36, wherein the web includes non-randomized machine direction oriented fibers, said entangling member has a generally planar configuration, said randomization provides machine and cross-direction oriented fibers in the web, and said void areas comprise a plurality of apertures arranged so that the spacing ratio of machine direction apertures is greater than cross-direction apertures.

38. The method of claim 37, wherein said traversing step is of sufficient duration to cause the fibers to migrate to said apertures to form nodes which are connected by interstitial fibers.

39. The method of claim 32, comprising the further steps of filtering fluid which impinges upon the web to remove fiber debris, and recirculating the filtered fluid to said divergent jets.

40. The method of claim 39, wherein said divergent jets are arranged in a row extending in a cross-direction, said divergent jets being approximately 1 inch apart.

41. The method of claim 40, wherein the web includes non-continuous and non-randomized fibers, said entangling member has a generally planar configuration, said randomization provides machine and cross-direction oriented fibers in the web, and said void areas comprise a plurality of apertures arranged so that the spacing ratio of machine direction apertures is greater than cross-direction apertures.

42. The method of claim 41, wherein said traversing step is of sufficient duration to cause the fibers to migrate to said apertures to form nodes which are connected by interstitial fibers.

43. The method of claim 40, wherein the web includes non-continuous and non-randomized fibers, said entangling member has a generally planar configuration, said randomization provides machine and cross-direction oriented fibers in the web, and said void areas comprise a plurality of apertures arranged so that the spacing ratio of cross-direction apertures is greater than machine direction apertures.

44. The method of claim 43, wherein said traversing step is of sufficient duration to cause the fibers to migrate to said apertures to form nodes which are connected by interstitial fibers.

45. The method of claim 40, wherein the web includes non-continuous and non-randomized fibers, said entangling member is a generally planar woven screen, said randomization provides machine and cross-direction oriented fibers in the web, and said void areas comprise at least 25% of the area of said woven screen.

46. A non-woven fabric made by the method of claim 37, which comprises a symmetrical array of entangled fibers, said symmetrical array including a lattice structure of dense nodes which are connected by interstitial fibers which have an MD/CD ratio in the range of 1:1–4:1.

47. A non-woven fabric made by the method of claim 32 fabricated of cotton fibers having an MD/CD ratio in the range of 1:1–4:1.

48. A non-woven fabric which comprises:
a symmetrical array of fluid entangled fibers including a lattice structure of spaced parallel machine direction ("MD") oriented rows of criss-crossing fibrous bands, and spaced cross-direction ("CD") oriented fibrous bands, said CD and MD fibrous bands intersecting at dense fiber nodes,
said CD and MD fibrous bands defining void areas which occupy at least 25 per cent of the fabric area,
said symmetrical array of fibers having a uniform cohesive grab tensile MD and CD strengths of at least 2 lbs/inch and 1 lb/inch, respectively, and an MD/CD ratio in the range of 1:1–4:1.

49. A non-woven fabric according to claim 48, wherein the fabric is made of staple No. 2 comber cotton fibers, and has a weight of approximately 24.5 to 39 gsy.

* * * * *